United States Patent [19]
Dan

[11] Patent Number: 5,844,382
[45] Date of Patent: Dec. 1, 1998

[54] MOTION TRANSMITTING APPARATUS FOR USE WITH AN AUTOMOTIVE VEHICLE MULTI-FUNCTIONAL APPARATUS

[75] Inventor: Petre Dan, Beverly Hills, Mich.

[73] Assignee: UT Automotive Dearborn, Inc, Dearborn, Mich.

[21] Appl. No.: 838,880

[22] Filed: Apr. 9, 1997

[51] Int. Cl.$^6$ ............................................. H02P 1/00
[52] U.S. Cl. ............................................. 318/10; 318/282
[58] Field of Search ..................... 318/9–15, 280–282, 318/283, 286, 466–470, 489, 250.001–250.48

[56]  References Cited

U.S. PATENT DOCUMENTS 2,271,207  1/1942  Rhein .
2,659,237  11/1953  Wood .

(List continued on next page.)

FOREIGN PATENT DOCUMENTS

| 822 178 | 11/1951 | Germany . |
| 3807087 A1 | 9/1989 | Germany . |
| 39 23 688 A1 | 1/1991 | Germany . |
| 43 13 363 A1 | 11/1993 | Germany . |
| 43 37 760 A1 | 5/1994 | Germany . |
| 5-86761 | 4/1993 | Japan . |
| 2 153 218 | 8/1985 | United Kingdom . |
| WO 96/33891 | 10/1996 | WIPO . |
| WO 96/33892 | 10/1996 | WIPO . |
| WO 96/33893 | 10/1996 | WIPO . |

OTHER PUBLICATIONS

"Goodheart–Wilcox Automotive Encyclopedia", William K. Toboldt, Larry Johnson, Steven W. Olive, 1989, pp. 723–726.
"Automotive Handbook", Bosch 3rd Edition, 1993, pp. 694–697.
"Kinematic Analysis of Mechanisms", 1959, J.E. Shigley, pp. 228–231.
"Genevamation Indexing Drives", Jan. 12, 1995 Catalog No. 693, Geneva Mechanisms Corporation.
"Saab Owners Workshop Manual", Haynes Publishing Group 1981, 1986, pp. 172–174, 237.
Machine Design, "Basics of Design Engineering", Jun. 1992, Article Mechanical Systems.
A paper from the Third Conference on Mechanisms, "A Survey of Intermittent–Motion", F.J.Bogardus, 1956, pp. 8–15.
Machine Design, Mechanisms for Intermittent Motion, Dec. 1951, Otto Lichtwitz, pp. 134–148.
"Mechanisms for Providing Intermittent Rotary Motion", Product Engineering, Aug. 1949, pp. 116–117.
Machine Design, "Mechanisms for Intermittent Motion, Part 2", Jan. 1952, Otto Lichtwitz, pp. 127–141.
Machine Design, "Mechanism for Intermittent Motion, Part 3", Feb. 1952, Otto Lichtwitz, pp. 146–155.
Machine Design, "Mechanism for Intermittent Motion, Part 4", Mar. 1952, Otto Lichtwitz, pp. 145–155.

(List continued on next page.)

Primary Examiner—Brian Sircus
Attorney, Agent, or Firm—Harness, Dickey & Pierce, P.L.C.

[57] ABSTRACT

A motion transmitting apparatus for use with an automotive vehicle multi-functional apparatus includes an electromagnetic device, a rotatable member, an interface surface, a shaft and an intermittent motion mechanism. Another aspect of the present invention provides rotation of the rotatable member within a first positional range to cause the interface surface to contact and move an arm of the intermittent motion mechanism from a first actuation position to a second actuation position. The arm subsequently moves past the actuation positions as to allow the interface surface to disengage the intermittent motion mechanism and continue rotating past the intermittent motion mechanism. The arm is thereafter biased back into a rotational path of the interface surface such that upon reversal of rotational direction of the rotatable member, the interface surface will reengage the arm and move the intermittent motion mechanism from the second actuation position to the first actuation position.

18 Claims, 14 Drawing Sheets

U.S. PATENT DOCUMENTS

| | | |
|---|---|---|
| 3,361,947 | 1/1968 | Schlebusch . |
| 3,421,380 | 1/1969 | Mansour . |
| 3,442,146 | 5/1969 | Simpson . |
| 3,443,442 | 5/1969 | Schweihs . |
| 3,443,455 | 5/1969 | Zugel . |
| 3,574,882 | 4/1971 | Petry . |
| 3,619,676 | 11/1971 | Kawakami . |
| 3,665,772 | 5/1972 | Beard et al. . |
| 3,688,332 | 9/1972 | Bellware . |
| 3,689,817 | 9/1972 | Elliott . |
| 3,694,723 | 9/1972 | Schneider et al. . |
| 3,803,627 | 4/1974 | Schuscheng . |
| 3,858,922 | 1/1975 | Yamanaka . |
| 3,917,330 | 11/1975 | Quantz . |
| 3,927,436 | 12/1975 | Inoue et al. . |
| 4,009,952 | 3/1977 | Badalich et al. . |
| 4,158,159 | 6/1979 | Orris et al. . |
| 4,173,055 | 11/1979 | Izumi et al. . |
| 4,183,114 | 1/1980 | Eden . |
| 4,259,624 | 3/1981 | Seibicke . |
| 4,271,381 | 6/1981 | Munz et al. . |
| 4,309,646 | 1/1982 | Liedtke et al. . |
| 4,336,482 | 6/1982 | Goertler et al. . |
| 4,352,299 | 10/1982 | Riggs et al. . |
| 4,422,522 | 12/1983 | Slavin et al. . |
| 4,434,678 | 3/1984 | Maus . |
| 4,450,390 | 5/1984 | Andrei-Alexandru et al. . |
| 4,478,004 | 10/1984 | Andrei-Alexandru et al. . |
| 4,492,904 | 1/1985 | Graham . |
| 4,553,656 | 11/1985 | Lense . |
| 4,573,723 | 3/1986 | Morita et al. . |
| 4,639,065 | 1/1987 | Kohler et al. . |
| 4,660,698 | 4/1987 | Miura . |
| 4,674,781 | 6/1987 | Reece et al. . |
| 4,702,117 | 10/1987 | Tsutsumi et al. . |
| 4,733,147 | 3/1988 | Muller et al. . |
| 4,878,398 | 11/1989 | Heinrich . |
| 4,885,512 | 12/1989 | Gille et al. . |
| 4,893,039 | 1/1990 | Isii . |
| 4,918,272 | 4/1990 | Nishikawa . |
| 5,007,131 | 4/1991 | Chevalier et al. . |
| 5,023,530 | 6/1991 | Ohashi et al. . |
| 5,045,741 | 9/1991 | Dvorsky . |
| 5,063,317 | 11/1991 | Bruhn . |
| 5,182,957 | 2/1993 | Bohmer et al. . |
| 5,218,255 | 6/1993 | Horiguchi . |
| 5,222,775 | 6/1993 | Kato . |
| 5,228,239 | 7/1993 | Heo . |
| 5,251,114 | 10/1993 | Cantin et al. . |
| 5,274,875 | 1/1994 | Chou . |
| 5,291,109 | 3/1994 | Peter . |
| 5,315,735 | 5/1994 | I-Shin . |
| 5,333,351 | 8/1994 | Sato . |
| 5,355,061 | 10/1994 | Forhan . |
| 5,355,286 | 10/1994 | Flint . |
| 5,373,605 | 12/1994 | Austin . |
| 5,427,345 | 6/1995 | Yamakami et al. . |
| 5,462,337 | 10/1995 | Yamakami . |
| 5,519,258 | 5/1996 | Stroven et al. . |
| 5,528,959 | 6/1996 | Yamakami . |

OTHER PUBLICATIONS

A paper from the Third Conference on Mechanisms, "Designing for Intermittent Motion with Modified Starwheels", Karl E. Kist, pp. 16–20.

"Mechanisms for Engineering Design", Motion, Circular, Intermittent, Chapter 3, S.B. Tuttle, John Wiley Co., pp. 33–51.

Machine Design, "Modifying Starwheel Mechanisms", Vandeman and Wood, Apr. 1952, pp. 255–261.

"Kinematics of Intermittent Mechanism III—The Spherical Geneva Wheel", Product Engineering, Oct. 1949, S. Rappaport, pp. 137–139.

Machine Design, "Mechanical Systems", Jun. 1992, pp. 130, 132, 168.

"Mechanisms and Dynamics of Machinery", Hamilton H. Mabie and Fred W. Ocvirk, John Wiley & Sons, 1957.

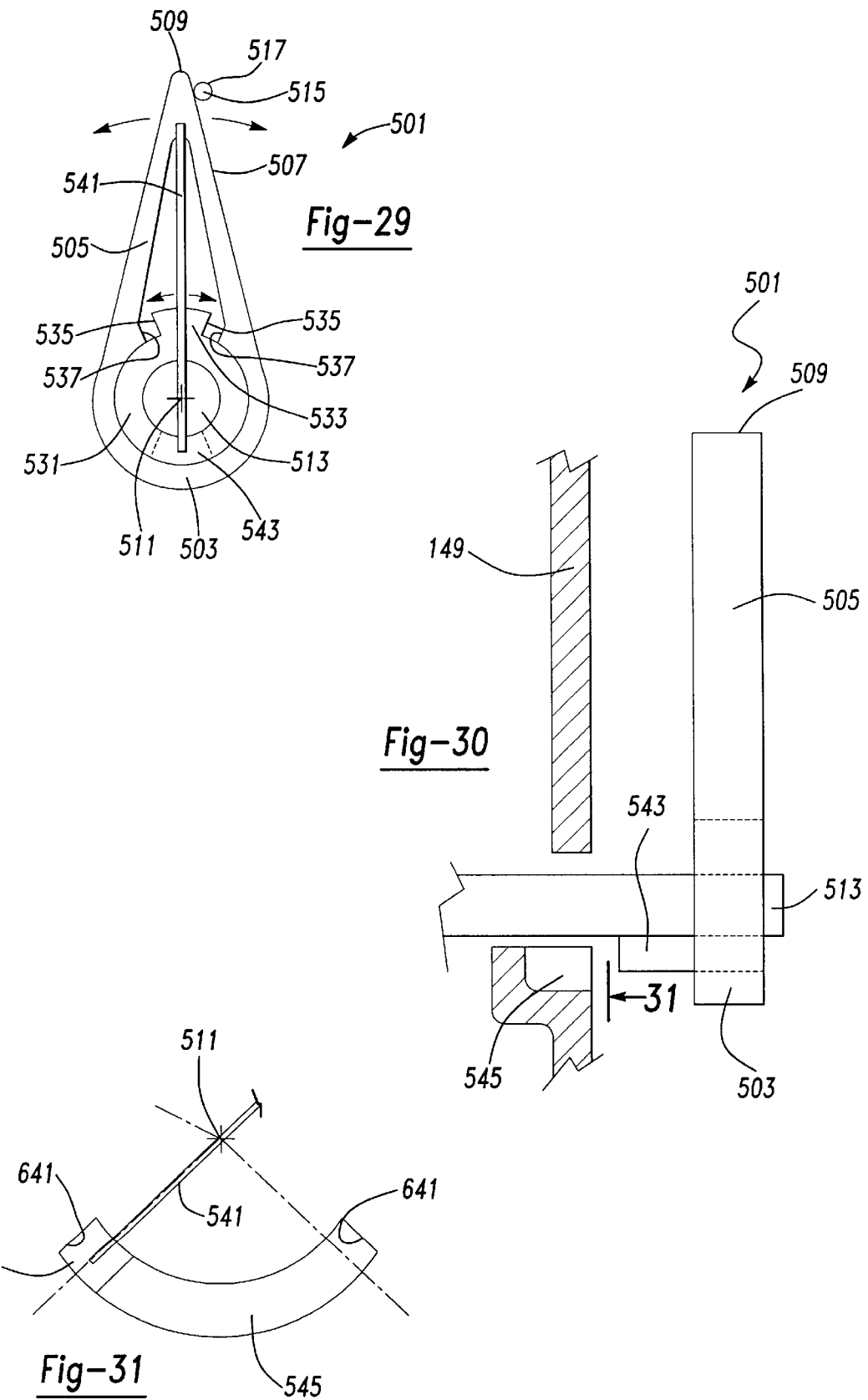

MOTION TRANSMITTING APPARATUS FOR USE WITH AN AUTOMOTIVE VEHICLE MULTI-FUNCTIONAL APPARATUS

BACKGROUND OF THE INVENTION

This invention relates generally to multi-functional apparatuses and specifically to a motion transmitting apparatus for use with an automotive vehicle multi-functional apparatus.

Almost all automotive vehicles have a single or a pair of windshield wiper assemblies. These assemblies traditionally include rubber wiper blades mounted upon claw brackets. These claw brackets are pivotably attached to wiper arms mounted upon rotating shafts. The shafts are either directly driven by electric motors or driven by a single electric motor which actuates a series or parallel-coupled four bar linkage mechanism. It is further known to provide a wiper system, in combination with a wash device, to clean headlamps for automotive vehicles.

It is also common to employ a window wiper assembly for cleaning rear windows of automotive vehicles. Typically, these types of rear window wiper assemblies include a wiper blade mounted upon a bracket which is coupled to a wiper arm. The wiper arm is attached to a wiper shaft rotatably driven in a cyclical oscillating manner by a helical gear. A reversible, fractional horsepower, direct current electric motor serves to actuate the helical gear through an armature shaft-mounted worm gear enmeshed therewith. This type of rear window wiper arrangement is usually mounted upon a pivoting liftgate of a minivan, station wagon, sport-utility vehicle or the like. One such example is disclosed in U.S. Pat. No. 5,519,258 entitled "System and Method for Controlling Vehicle Lift Gate Window Wiper" which issued to Stroven et al. on May 21, 1996.

Some conventional vehicles also provide a rear window release lock or latch, actuated by a solenoid, which can be unlocked to allow for upward pivotal movement of a rear window in relation to the otherwise stationary liftgate. In combination therewith, a separate liftgate lock is often mounted upon the liftgate door for fastening the liftgate to the body thereby preventing inadvertent pivotal opening. This liftgate lock is traditionally operated by manual key or handle rotation, or through a separate electric motor or solenoid.

Separate motors or solenoids are commonly required to actuate these various locks and the wiper. The traditional need for such a multiplicity of electromagnetic devices has increased the automotive vehicle weight and cost while further proving difficult to package within the often small spaces provided. This added weight is especially detrimental when the window wiper mechanism, rear window lock and liftgate lock, as well as their distinct respective electromagnetic devices, are all incorporated within the pivoting liftgate. Not only is the piece cost increased due to this multiplicity of electromagnetic devices, but the assembly cost, part number proliferation and handling costs, electric wiring costs, objectional motor noise, and failure modes are increased.

Furthermore, U.S. Pat. No. 3,688,332 entitled "Mechanism for Opening and Closing a Cover for a Concealed Windshield Wiper System" which issued to Bellware on Sep. 5, 1972, discloses a windshield wiper driven by an electric motor and an interruptable driving connection controlled by a separate electromagnet. This device further employed levers and pivot pins to open and close a cover. More recently, WO 96/33891 entitled "Multi-Functional Apparatus Employing an Intermittent Motion Mechanism," WO 96/33893 entitled "Multi-Functional Apparatus Employing an Electromagnetic Device," and WO 96/33892 entitled "Control System for an Automotive Vehicle Multi-Functional Apparatus," all of which were published on Oct. 31, 1996, disclose a significantly improved system wherein a single electromagnetic device can selectively operate intermittent motion mechanisms coupled to a window wiper, a door lock, a window release lock and the like. Notwithstanding, these devices require further refinement and improvement. For example, if the window wiper is frozen onto a window, a door could not be unlocked, with the geneva and starwheel mechanism constructions. Moreover, a car wash or bumpy road could cause the window wiper to undesirably and destructively move from its parked position when a wiper clutch is disengaged, for the split-shaft clutch construction. The split-shaft clutch embodiment also requires further improvements and refinements to increase the durability and robustness of design, while further minimizing the weight of the unit.

SUMMARY OF THE INVENTION

In accordance with the present invention, the preferred embodiment of the motion transmitting apparatus for use with an automotive vehicle multi-functional apparatus includes an electromagnetic device, a rotatable member, an interface surface, a shaft and an intermittent motion mechanism. In another aspect of the present invention, a window wiper arm is coupled to the shaft. In a further aspect of the present invention, a second intermittent motion mechanism couples the wiper shaft to the rotatable member. In still another aspect of the present invention, a third intermittent motion mechanism couples a window lock to the rotatable member. An additional aspect of the present invention provides rotation of the rotatable member within a first positional range to cause the interface surface to contact and move an arm of the intermittent motion mechanism from a first actuation position to a second actuation position. The arm subsequently moves past the actuation positions so as to allow the interface surface to disengage the intermittent motion mechanism and continue rotating past the intermittent motion mechanism. The arm is thereafter biased back into a rotational path of the interface surface such that upon reversal of rotational direction of the rotatable member, the interface surface will reengage the arm and move the intermittent motion mechanism from the second actuation position to the first actuation position.

It is believed that this construction will significantly reduce manufacturing tolerances and costs as compared to geneva mechanisms, starwheel mechanisms, gears and the like. Moreover, the specific lever intermittent motion mechanisms disclosed are advantageous by providing a means for backdriving the intermittent motion mechanisms by manual rotation of a lock key cylinder. The apparatus of the present invention is advantageous over other known devices in that the window and door can be unlocked even if the window wiper is frozen onto the window. Furthermore, the present invention is advantageous by pinning or securing the window wiper in a park position even when the same electromagnetic device that would otherwise operate the wiper is alternately actuating a lock. The present invention further increases the durability and robustness of the multi-functional unit while minimizing weight.

The multi-functional apparatus of the present invention is also advantageous over conventional systems the present invention combines many different functions into a single apparatus. For example, the present invention multi-functional apparatus replaces the traditional separate rear wiper motor, liftgate lock/unlock motor or actuator, and rear window unlock solenoid. Accordingly, the present invention multi-functional apparatus significantly reduces the piece cost, assembly cost, part proliferation and handling costs, and wiring costs as compared to conventional constructions. Furthermore, the multi-functional apparatus of the present invention significantly reduces weight and packaging space requirements while increasing the electrical and mechanical reliability of the affected systems. Objectional motor and solenoid noises are also reduced. Additional advantages and features of the present invention will become apparent from the following description and appended claims, taken in conjunction with the accompanying drawings.

BRIEF DESCRIPTION OF THE DRAWINGS

FIG. 29 is a rear elevational view showing a first preferred embodiment lever intermittent motion mechanism of the apparatus of the present invention;

FIG. 30 is a partially exploded and fragmented side elevational view showing the first preferred embodiment lever intermittent motion mechanism;

FIG. 31 is a diagrammatic view, as viewed in the direction of arrow 31 of FIG. 30, showing the first preferred embodiment lever intermittent motion mechanism;

DETAILED DESCRIPTION OF THE PREFERRED EMBODIMENT

Figure 1:
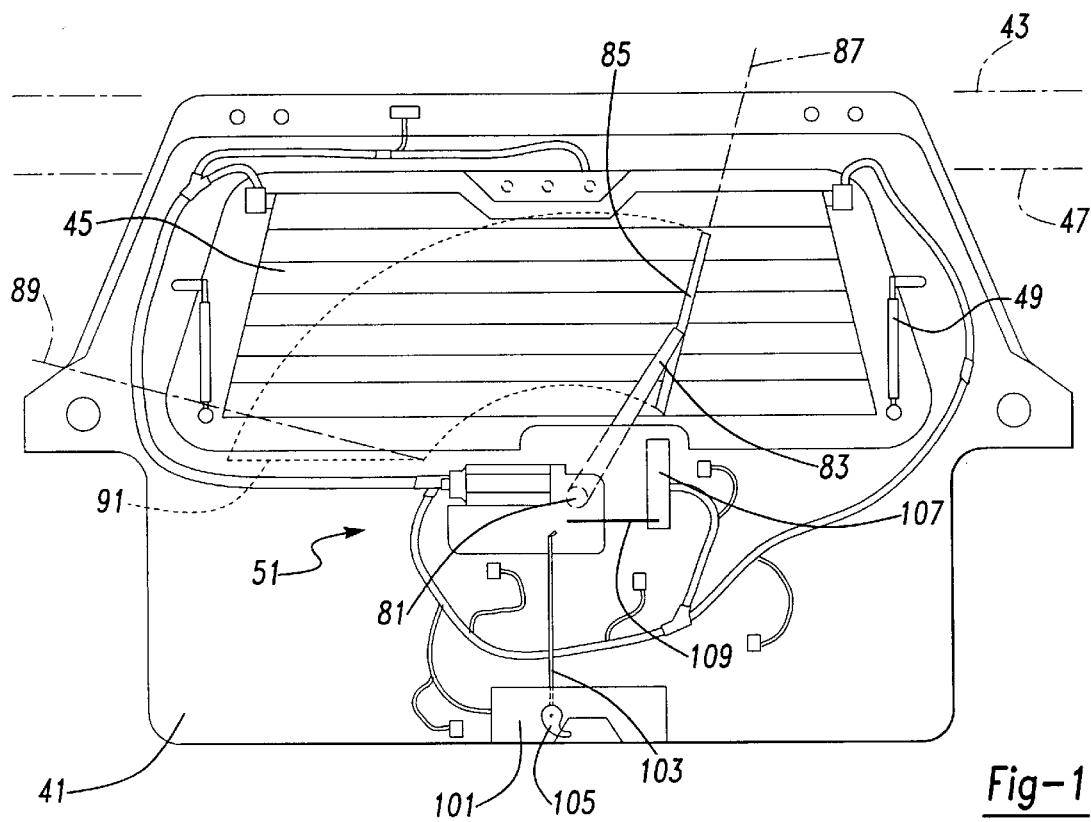
FIG. 1 is a front elevational view showing the preferred embodiment of the apparatus of the present invention.
Figure 2:
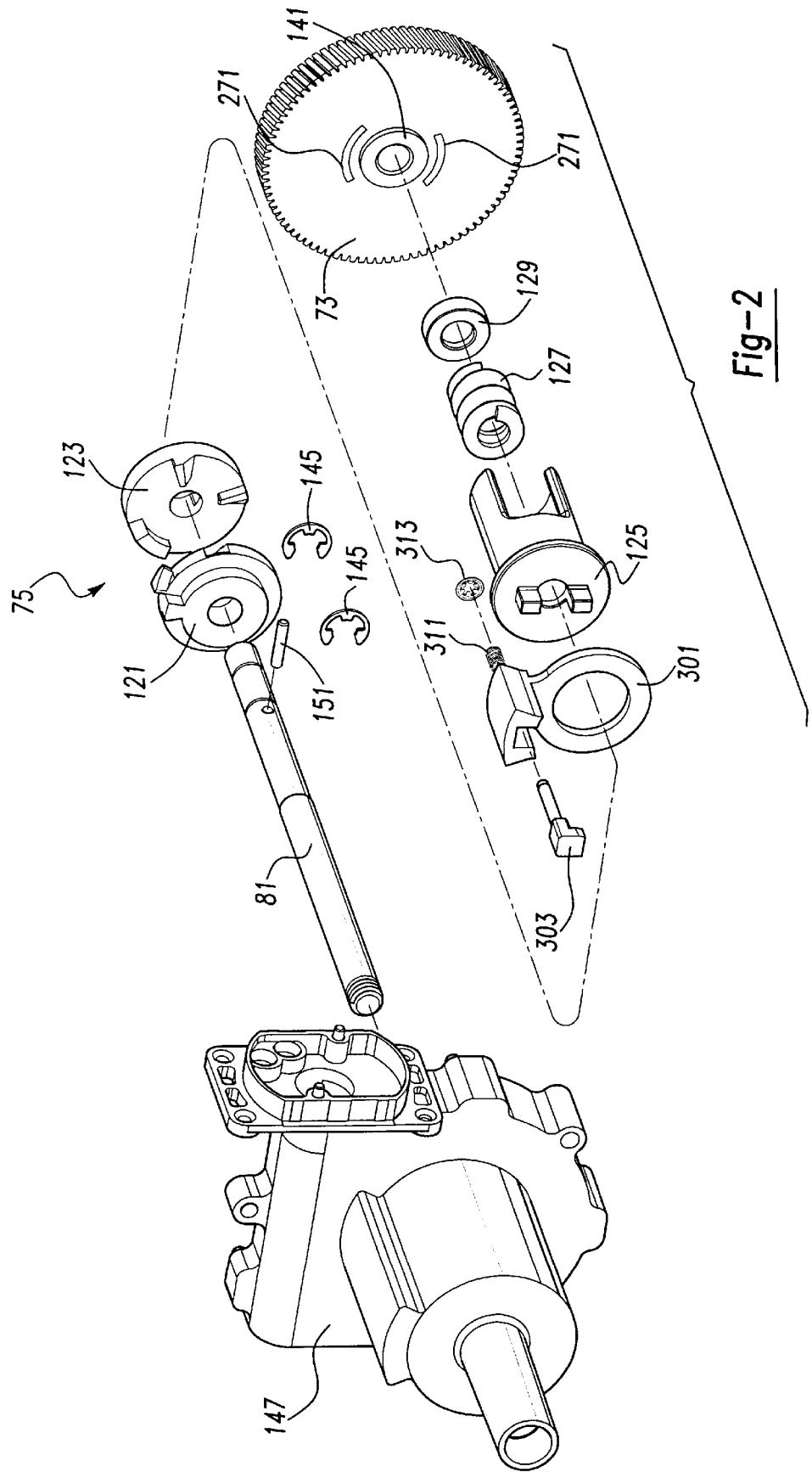
FIG. 2 is an exploded, rear perspective view showing the preferred embodiment apparatus.
Figure 3:
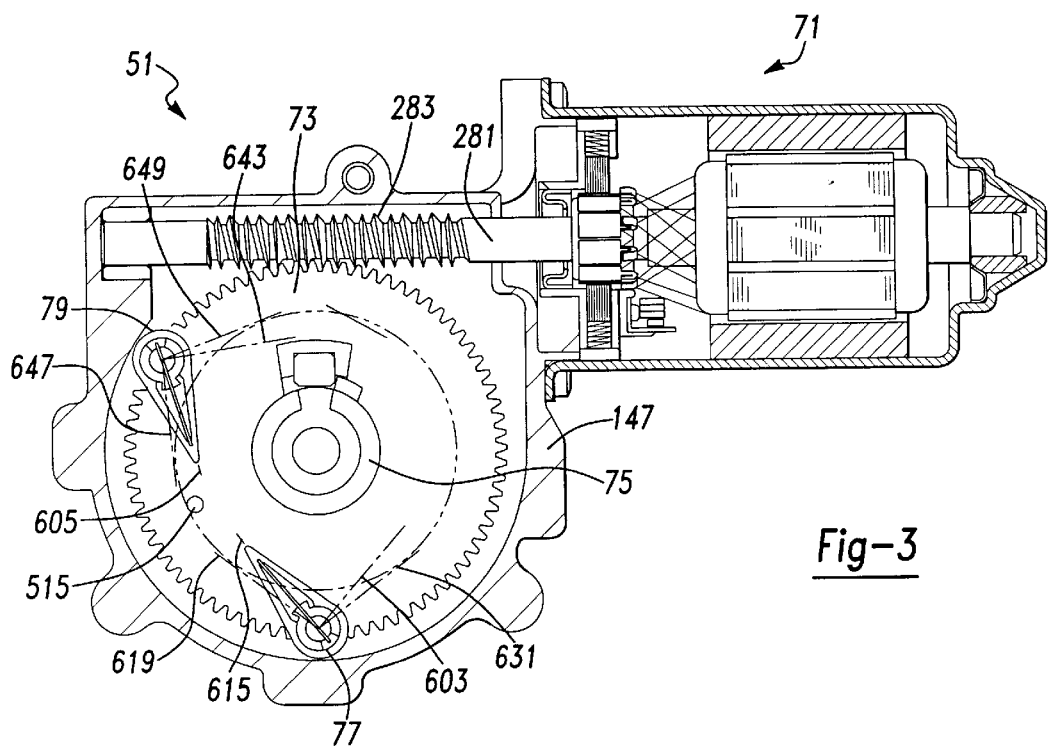
FIG. 3 is a partially fragmented, rear elevational view showing the preferred embodiment apparatus.
Figure 4:
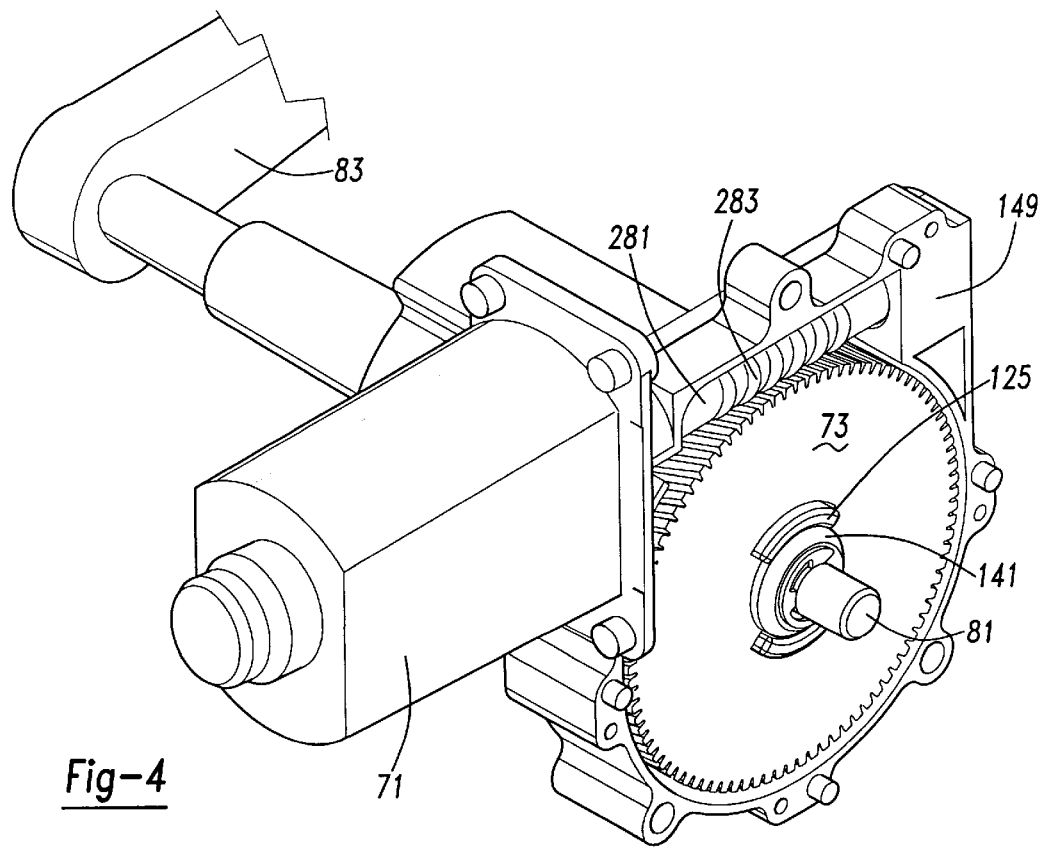
FIG. 4 is a front perspective view showing the preferred embodiment apparatus with a gear housing cover removed.
Figure 6:
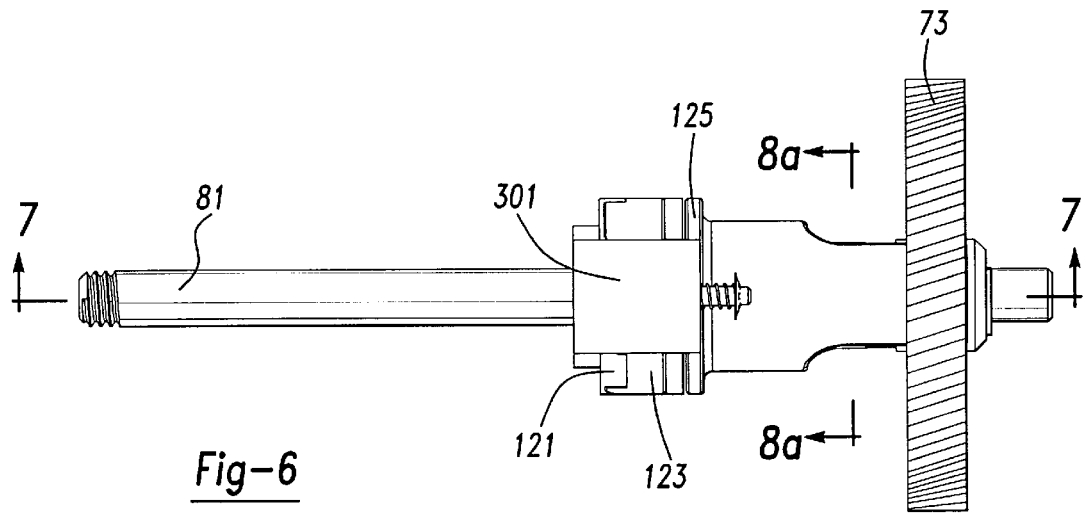
FIG. 6 is a top elevational view showing the clutch of the preferred embodiment apparatus disposed in an engaged position.
Figure 5:
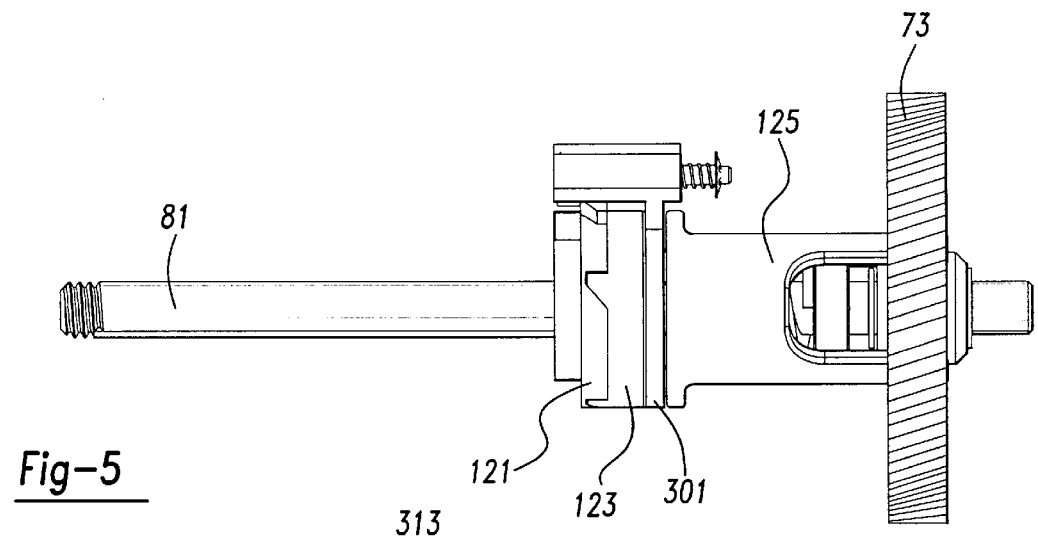
FIG. 5 is a side elevational view showing a clutch of the preferred embodiment apparatus disposed in an engaged position.
Figure 8A:
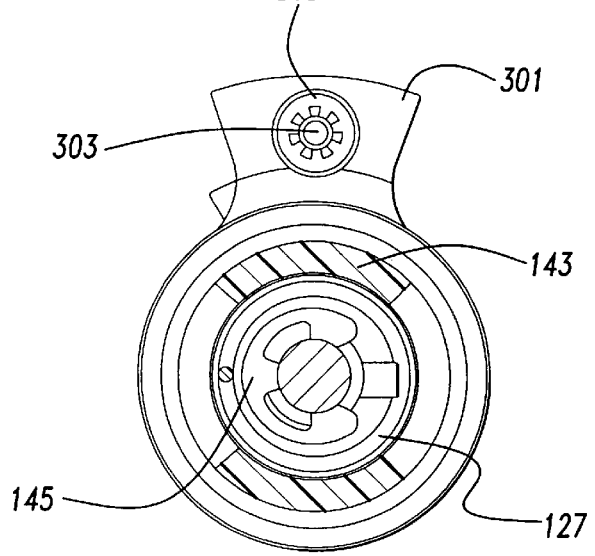
FIG. 8a is a cross sectional view, taken along line 8a—8a of FIG. 6, showing the preferred embodiment apparatus.
Figure 7:
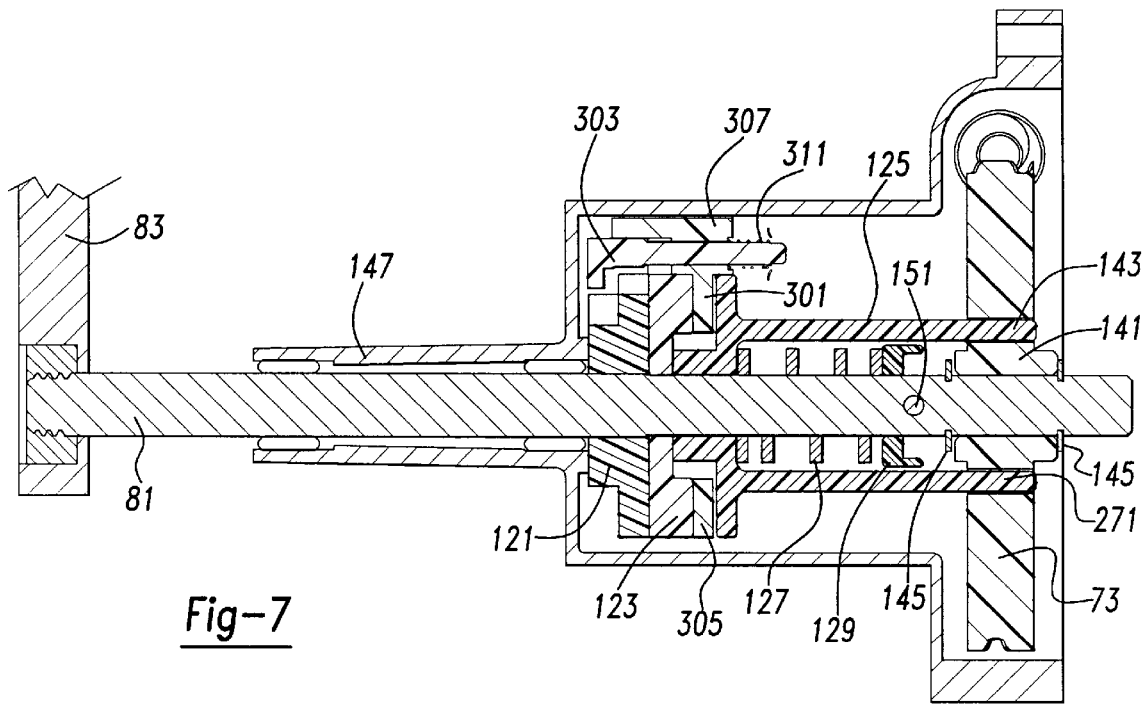
FIG. 7 is a sectional view, taken along line 7—7 of FIG. 6, showing the preferred embodiment apparatus.
Figure 11:
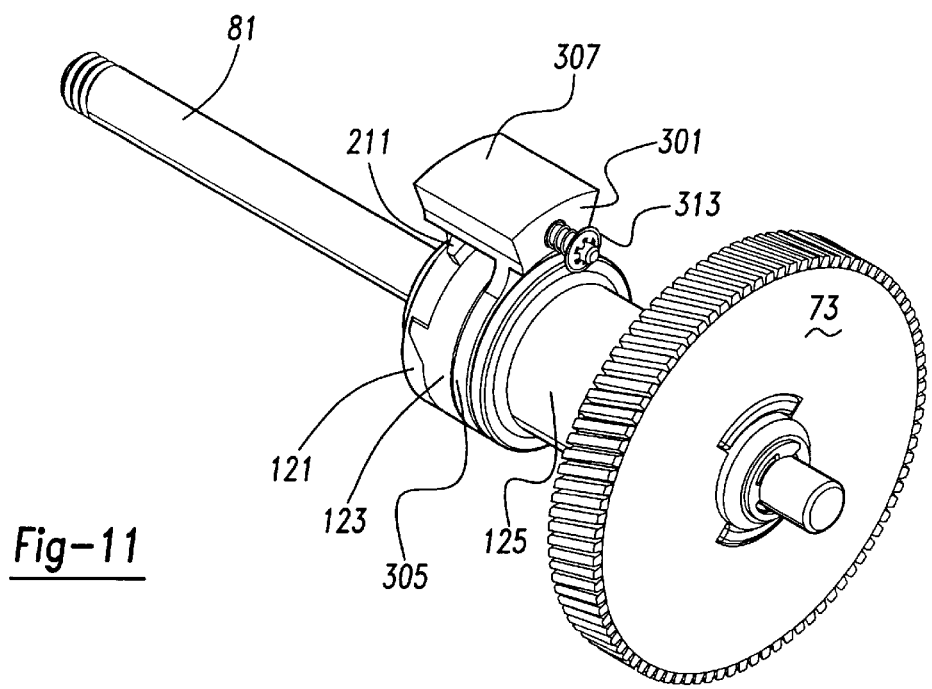
FIG. 11 is a front perspective view showing the clutch of the preferred embodiment apparatus disposed in an engaged position.
Figure 8:
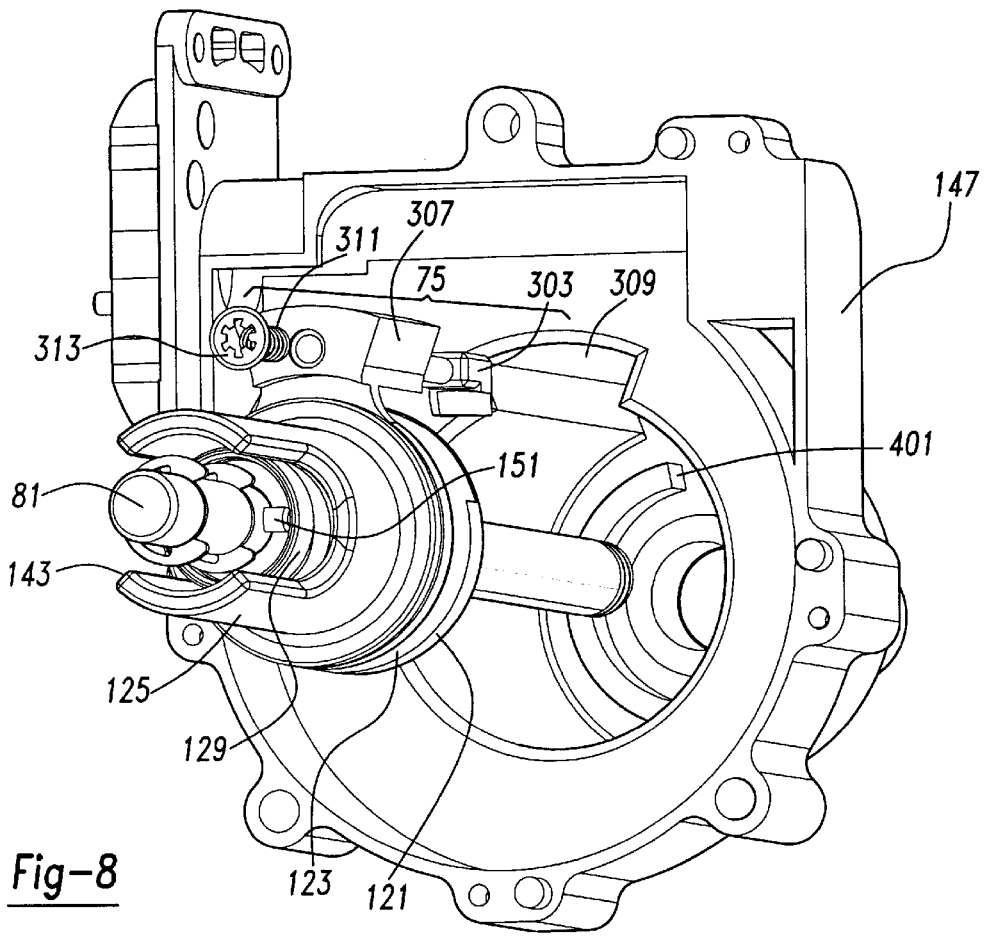
FIG. 8 is a partially exploded front perspective view showing the preferred embodiment apparatus.
Figure 9:
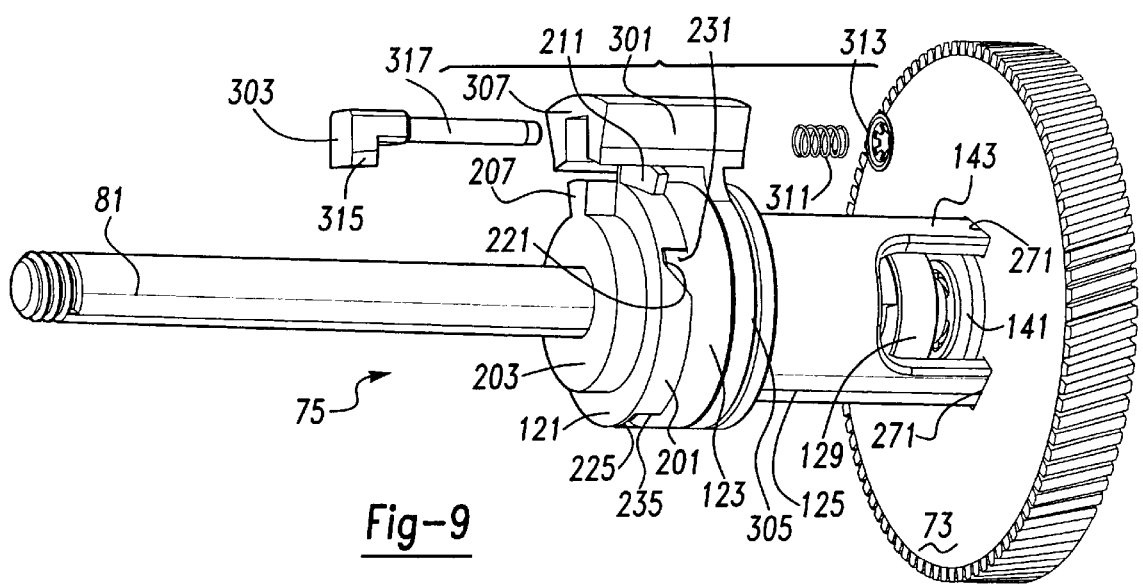
FIG. 9 is a rear perspective view showing the clutch of the preferred embodiment apparatus disposed in an engaged position.

An automotive vehicle, such as a minivan, sport utility vehicle or the like, has a rear liftgate door 41 which can pivot about a generally horizontal, hinging pivot axis 43. When the liftgate is pivoted to an open position, a cargo space or passenger compartment is accessible from behind the vehicle. Such an arrangement is shown in FIG. 1. Liftgate 41 has a rear window or backlite 45 which is pivotable between a closed position, substantially flush with the outer surface of liftgate 41, to an open position, about a generally horizontal pivot axis 47. A pair of pneumatic cylinders 49 act to push window 45 toward the open position when a lower portion of window 45 is released.

The preferred embodiment of a multi-functional apparatus 51 of the present invention is mounted upon an inner surface of liftgate 41. The majority of apparatus 51 is hidden by an interior trim panel (not shown). Referring to FIGS. 1–4, multi-functional apparatus 51 includes a fractional horsepower, direct current electric motor 71, a helical main gear 73, a first intermittent motion mechanism 75, a second intermittent motion mechanism 77 and a third intermittent motion mechanism 79. A window wiper shaft 81 is selectively coupled to gear 73 by way of first intermittent motion mechanism 75 for rotating a rear window wiper arm 83 and wiper blade 85 in an oscillating manner from a first wiping position 89 to a second wiping position 87 on window 45. Wiper shaft 81, arm 83 and blade 85 are also rotatable to a park position 91, removed from window 45. Movement of wiper blade 85 to park position 91 allows free opening and closing of window 45 without interference of wiper 85.

Second intermittent motion mechanism 77 selectively couples a liftgate door panel lock 101 to gear 73. More specifically, a door lock linkage 103 serves to rotate a hook-like or bifurcated latch 105 in response to rotation of second intermittent motion mechanism 77. Various lost motion linkages can also be employed between linkage 103 and latch 105. A window panel lock or latch 107 is movably coupled to third intermittent motion mechanism 79 by another lost motion lock linkage 109. Actuation of window lock 107 allows for the release of window 45.

Figure 26:
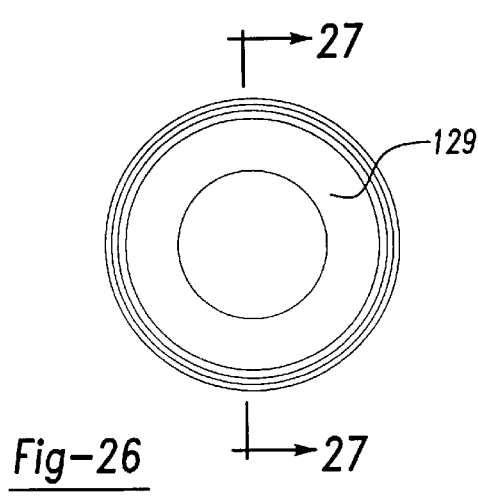
FIG. 26 is a front elevational view showing a spring retainer of the preferred embodiment apparatus.
Figure 27:
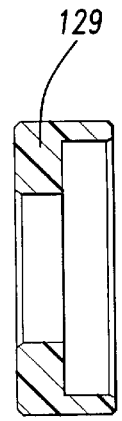
FIG. 27 is a cross sectional view, taken along line 27—27 of FIG. 26, showing the spring retainer of the preferred embodiment apparatus.

As can best be observed in FIGS. 2, 7, 8, 8a and 9, first intermittent motion mechanism 75 includes a cam follower disk 121, a cam disk 123, a driving sleeve 125, a helically wound compression spring 127 and a spring retainer 129, all of which generally surround wiper shaft 81. An annular bushing segment 141 of gear 73 coaxially surrounds a proximal end of wiper shaft 81 and rotatably supports wiper shaft 81 concentrically with gear 73 and a bifurcated end 143 of driving sleeve 125. A pair of lock or snap rings 145 are longitudinally positioned on either side of bushing segment 141 for maintaining the positional relationship of wiper shaft 81 relative to gear 73 and the adjacent gear housing cover 147. A cylindrical pin 151 is positioned through a transverse bore in wiper shaft 81. Pin 151 serves to longitudinally secure spring retainer 129 relative to wiper shaft 81. Spring retainer can best be viewed in FIGS. 26 and 27.

Referring now to FIGS. 9 and 16–22, cam follower disk 121 has a pair of stepped annular structures 201 and 203 with a central common aperture 205 pressfit or otherwise rotationally secured upon wiper shaft 81. A motion limiting primary tab 207 transversely depends from structure 203 and is defined by a pair of flat walls 209 perpendicularly extending in a longitudinal direction from structure 201. A supplemental locking tab 211 peripherally depends from structure 201. A wedge surface 213 defines a lock moving ramp which allows rotation of the wiper shaft past a lock for subsequent engagement. An abutting wall 214 is also provided on secondary tab 211 and is generally coplanar with wall 209 of primary tab 207. Abutting wall 214 acts as the park position locking surface.

Three finger receptacles 221, 223 and 225 are recessed into a backside of cam follower disk 121. Three fingers 231, 233 and 235 are engagable within finger receptacles 221, 223 and 225, respectively. The fingers and receptacles are not equidistant from each other and they have different sizes, in order to allow engagement of cam 123 with cam follower 121 in only one rotational position. A backface of cam disk 123 further has a longitudinal depression 237 intersecting a central aperture 239.

Referring now to FIGS. 7 and 21–24, driving sleeve 125 has a hollow, circular-cylindrical shaped body 251 which receives compression spring 127, spring retainer 129 and bushing 141. An annular shoulder 253 is disposed on said body 251 longitudinally opposite from bifurcated end 143. A circular aperture 255 longitudinally extends through shoulder 253 with clearance around wiper shaft 81. Compression spring 127 is operably compressed between an inside surface of shoulder 253 and spring retainer 129. Tongues 257 are symmetrically disposed on either side of aperture 255 and longitudinally depend from shoulder 253. Tongues 257 engage with groove 237 of cam disk 123 so as to rotate cam 123 in concert with rotation of driving sleeve 125. As can be seen in FIGS. 2, 4, 7 and 9, bifurcated end 143 of driving sleeve 125 fits within a pair of arcuate slots 271 of gear 73. Accordingly, when electric motor 71 is selectively energized, an armature 281 and worm form 283 will rotate gear 73 a predetermined angular or rotational amount and thereby concurrently rotating driving sleeve 125 and cam disk 123.

A locking sleeve 301 and lock 303 are illustrated in FIGS. 7, 8, 9, 10a, 11, 14 and 15. Locking sleeve 301 has a ring segment 305 and a lock housing segment 307. Ring segment 305 concentrically surrounds wiper shaft 81 and is longitudinally trapped for movement between cam disk 123 and driving sleeve 125. Lock housing segment 307 mates with a transversely offset cavity 309 of cover 147 in a keyhole-like manner such that lock sleeve 301 is prevented from rotation but is allowed to longitudinally move in a linear manner. Lock 303 is movably disposed in lock housing segment 307. A helically wound compression spring or resilient member 311 is compressed between a metallic push nut 313, having a set of inwardly projecting and angled fingers, and a facing surface of lock housing segment 307. Spring 311 serves to linearly and longitudinally bias lock 303 relative to locking sleeve 301 when lock 303 rides against supplemental tab 211. Lock 303 is further defined by a head 315 and a circular-cylindrical pedestal 317.

The operation of first intermittent motion mechanism 75 can best be understood by referring to FIGS. 5–7 and 9–13. First intermittent motion mechanism 75 essentially acts as a clutch in selectively engaging and disengaging wiper shaft 81 from gear 73. Fingers 231, 233 (see FIG. 20) and 235 of cam disk 123 are fully engaged within finger receptacles 221, 223 (see FIG. 17) and 225 of cam follower disk 201 when the electric motor has been energized to rotate gear 73 within a window wiping positional range and between the window wiping positional range and the initial park position. This engaged condition is shown in FIGS. 5–7, 9 and 11. In this engaged clutch position, spring 127 biases driving sleeve 125, locking sleeve 301 and cam disk 123 away from gear 73 such that cam follower disk 121 and wiper shaft 81 will rotate and oscillate concurrent with rotation and oscillation of gear 73.

Figure 10:
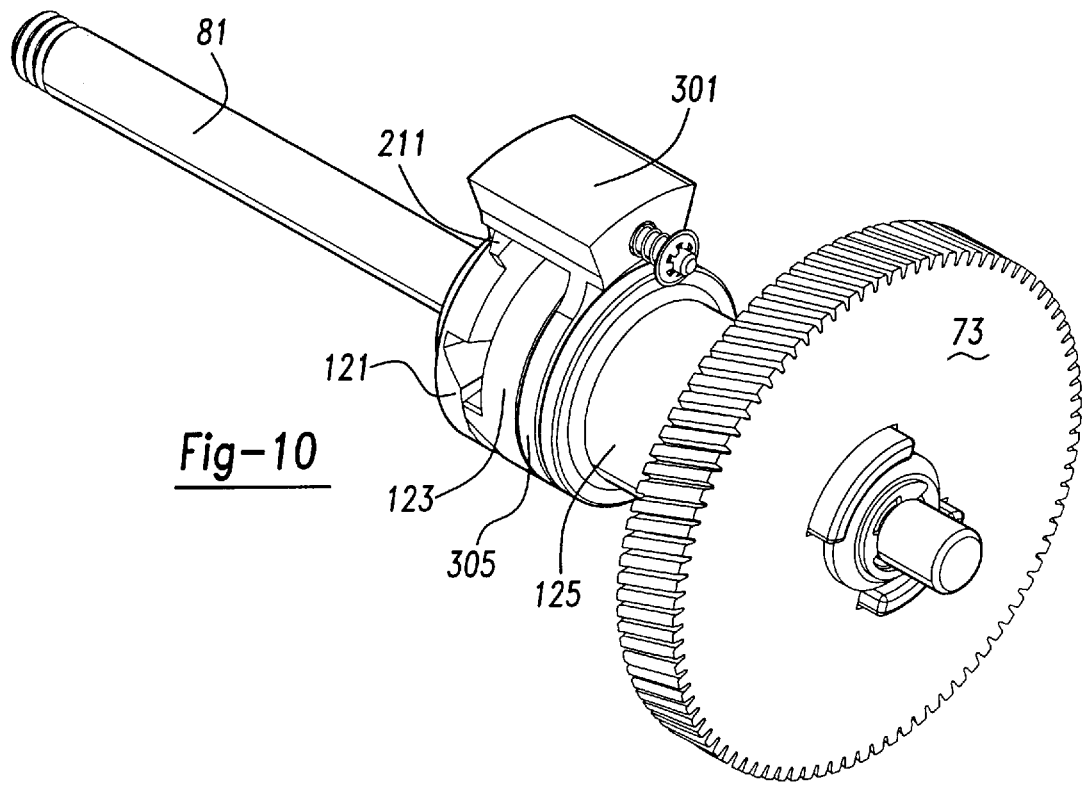
FIG. 10 is a front perspective view showing the clutch of the preferred embodiment apparatus disposed in a disengaged position.
Figure 12:
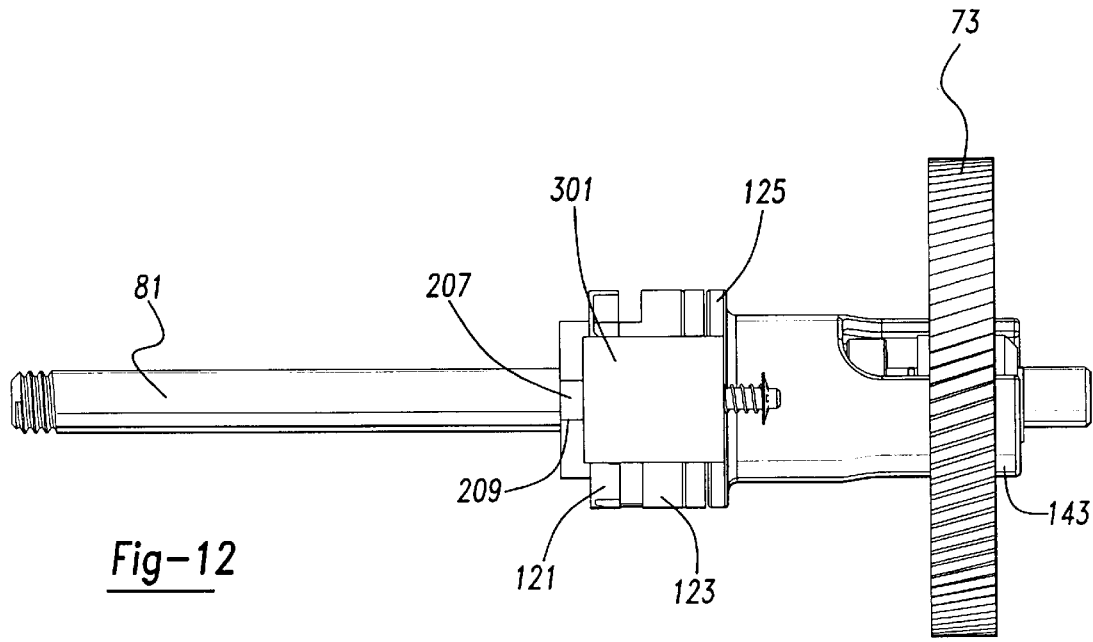
FIG. 12 is a top elevational view showing the clutch of the preferred embodiment apparatus disposed in a disengaged position.
Figure 13:
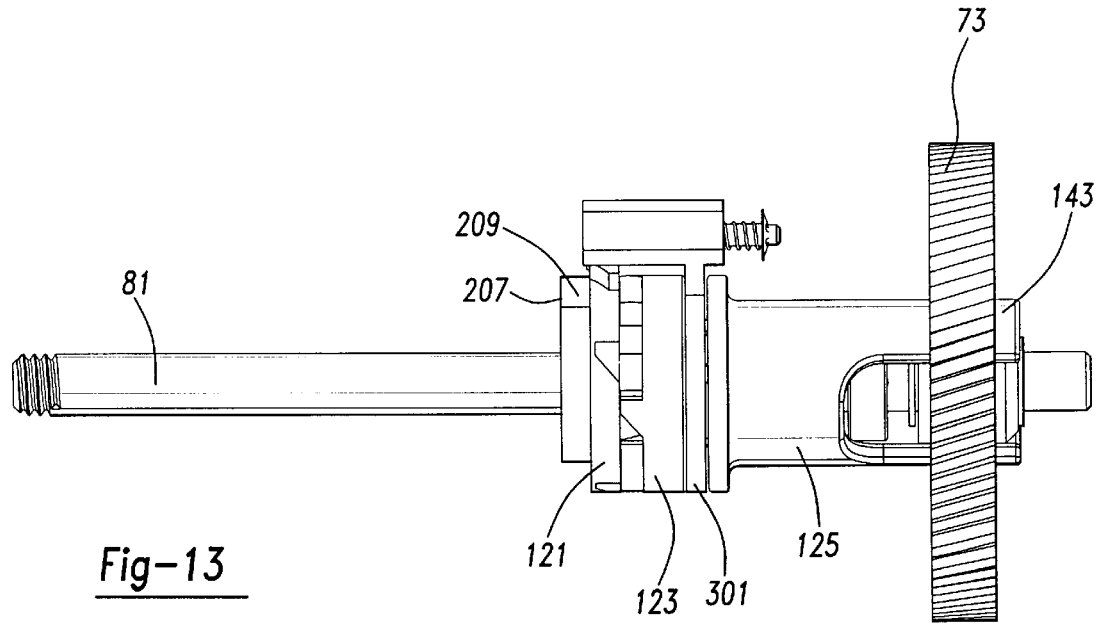
FIG. 13 is a side elevational view showing the clutch of the preferred embodiment apparatus disposed in a disengaged position.
Figure 14:
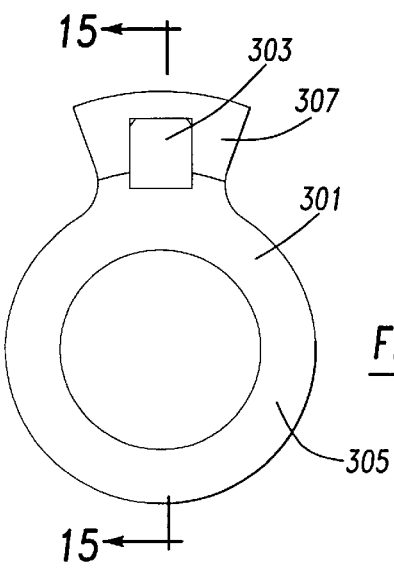
FIG. 14 is a rear elevational view showing the lock assembly of the preferred embodiment apparatus.
Figure 15:
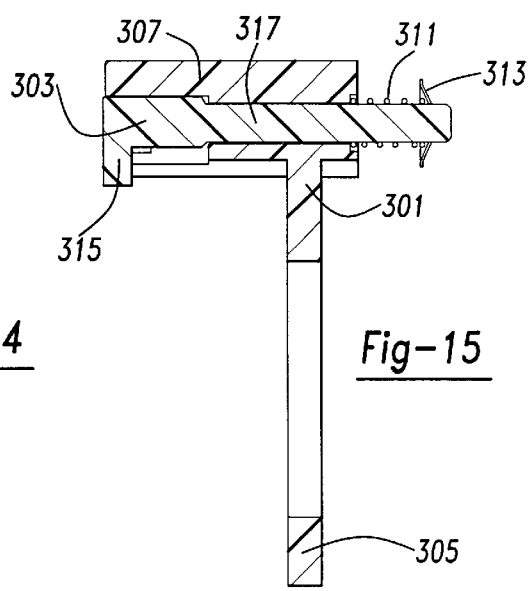
FIG. 15 is a cross sectional view, taken along line 15—15 of FIG. 14, showing the lock assembly of the preferred embodiment apparatus.
Figure 16:
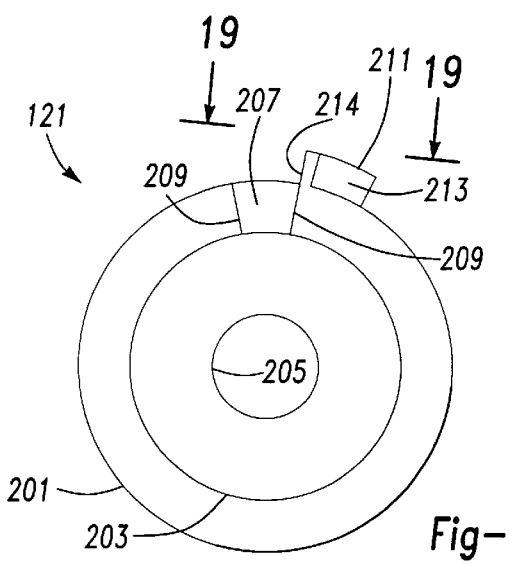
FIG. 16 is a rear elevational view showing a cam follower disk of the preferred embodiment apparatus.
Figure 17:
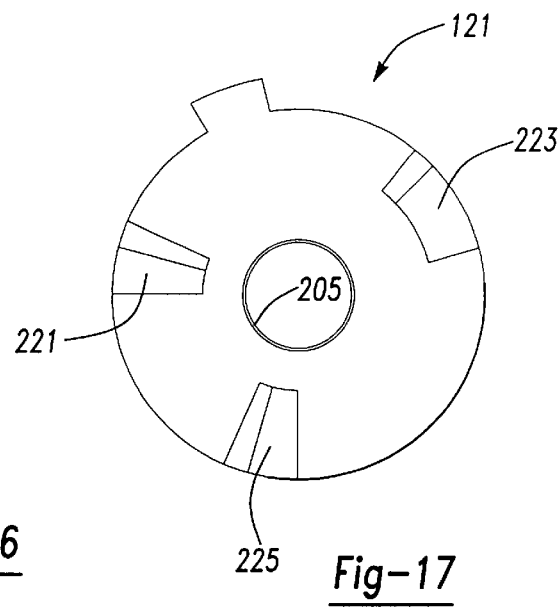
FIG. 17 is a front elevational view showing the cam follower disk of the preferred embodiment apparatus.
Figure 18:
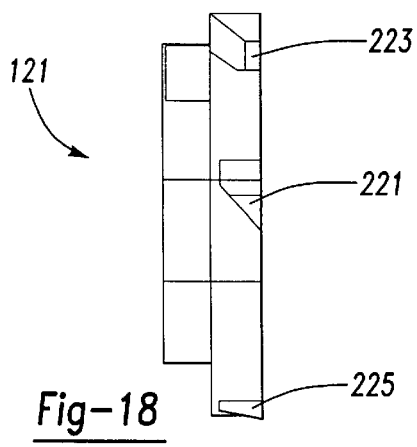
FIG. 18 is a side elevational view showing the cam follower disk of the preferred embodiment apparatus.
Figure 19:
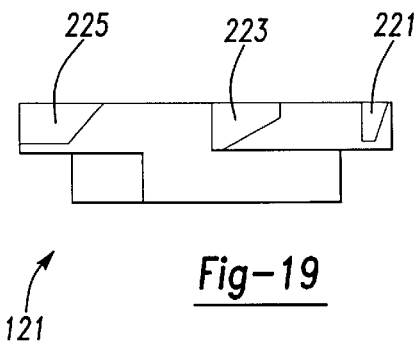
FIG. 19 is a true side view, viewed in the direction of arrow 19 of FIG. 16, showing the cam follower disk of the preferred embodiment apparatus.
Figure 20:
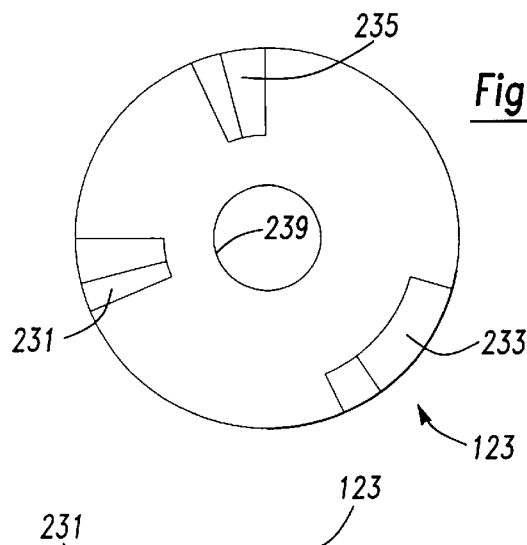
FIG. 20 is a rear elevational view showing a cam disk of the preferred embodiment apparatus.
Figure 21:
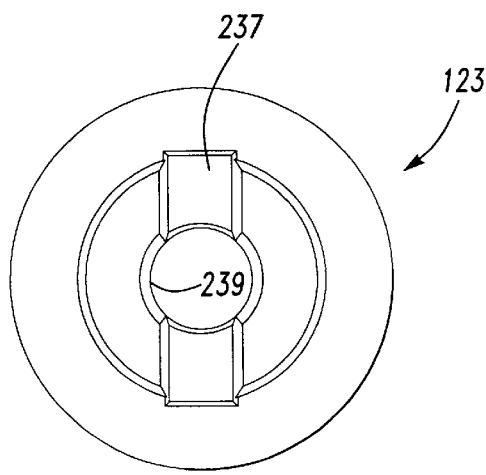
FIG. 21 is a front elevational view showing the cam disk of the preferred embodiment apparatus.
Figure 22:
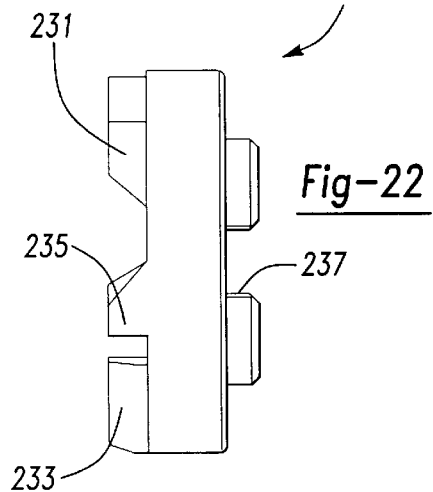
FIG. 22 is a side elevational view showing the cam disk of the preferred embodiment apparatus.
Figure 23:
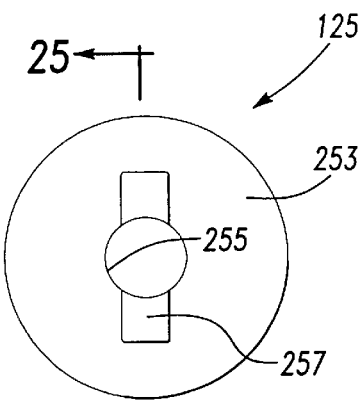
FIG. 23 is a rear elevational view showing a driving sleeve of the preferred embodiment apparatus.
Figure 24:
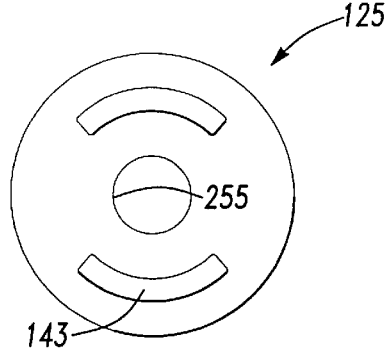
FIG. 24 is a front elevational view showing the driving sleeve of the preferred embodiment apparatus.
Figure 25:
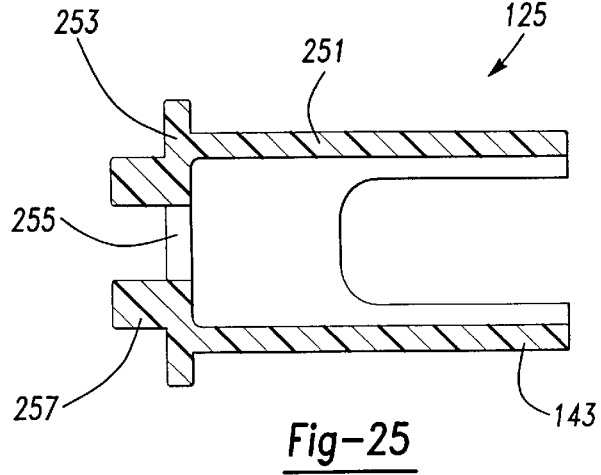
FIG. 25 is a sectional view, taken along line 25—25 of FIG. 23, showing the driving sleeve of the preferred embodiment apparatus.

In the clutch disengaged position shown in FIGS. 10, 12 and 13, wall 209 of the cam follower disk primary tab 207 abuts against a wiping range stop 401 (see FIG. 8) of cover 147 (also see FIG. 8), such that cam follower disk 121 and wiper shaft 81 are prevented from further rotation. However, the electric motor selectively further continues the rotation of gear 73 along the rotational direction thereby causing coincidental rotation of driving sleeve 125 and cam disk 123. This continued rotational movement causes the inclining surface of each cam disk finger to longitudinally push cam disk 123, lock sleeve 301 and driving sleeve 125 toward gear 73. This also serves to compress spring 127 (see FIG. 7). Bifurcated end 143 of driving sleeve 125 passes through gear 73 in this state. Thus, cam follower disk 121 and cam disk 123 are effectively separated. Gear 73 can further rotate to various other positional ranges as will be discussed in further detail hereinafter while wiper shaft 81 remains in a park position.

Figure 10A:
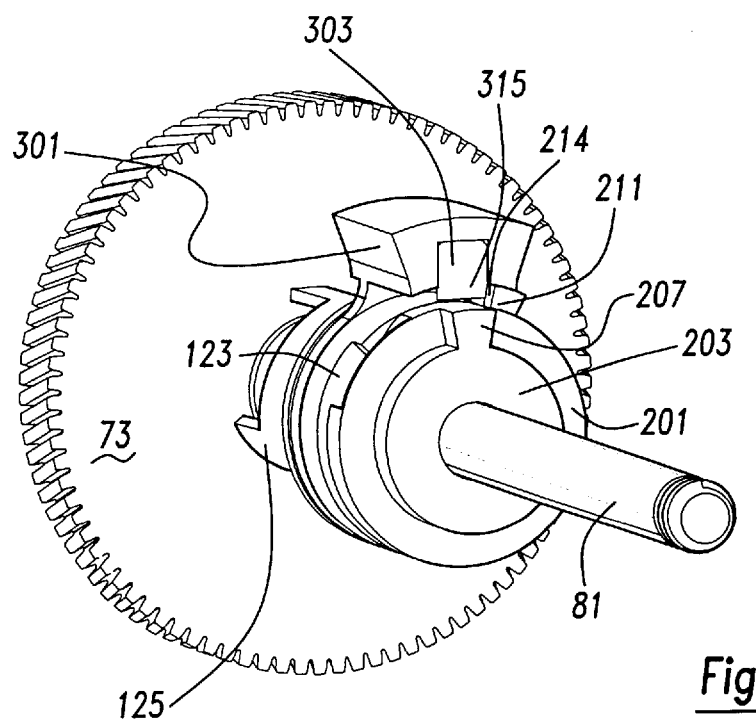
FIG. 10a is a rear perspective view showing the clutch of the preferred embodiment apparatus disposed in a disengaged position and a lock in a locked position.

As shown in FIG. 10a, the clutch disengaged movement further serves to lock or pin wiper shaft 81 in the park position by abutting head 315 of lock 303 against abutting wall 214 of secondary locking tab 211. Gear 73, driving sleeve 125 and cam disk 123 are further rotated to an initial park position after the clutch is disengaged. Lock 303 is released from tab 211 when the rotational direction of gear 73 is reversed back past through the park position so that cam disk 123 reengages with cam follower disk 201 for concerted movement. This causes head 315 of lock 303 to longitudinally move free of tab 211.

Referring now to FIGS. 3, 28–31 and 33, second and third intermittent motion mechanisms 77 and 79 preferably consist of rotating levers 501 having a partially circular mounting base 503 and an elongated arm 505. A peripheral engagement or abutting edge surface 507 of arm 505 is angled or tapered from the enlarged mounting base 503 toward a distal tip 509. Thus, arm 505 has a generally triangular shape. Mounting base 503 has a central pivot axis 511 mounted for rotation to gear housing 149. A lock linkage rod 513 is mounted for rotation to mounting base 503. A driving pin 515, having a peripheral interface surface 517, is affixed to gear 73 and selectively engages and pushes against edge 507. Lever 501 is preferably made from powdered-metal steel.

In a first preferred embodiment, a separate bushing 531, having a circular configuration, is movably retained in mounting base 503 of lever 501. A leg 533 projects from a periphery of bushing 531 and has an abutting surface 535 which operably abuts against an adjacent abutting surface 537 of mounting base 503. A steel leaf spring 541 has a first end secured within a slot of arm 505 adjacent tip 509 and has a second and opposite end secured within a slot in bushing 531. A foot 543 depends from a face of bushing 531 and is movably received within a pocket 545 or slot in housing 149. Pocket 545 has an arcuate shape equidistant around pivot axis 511.

Accordingly, when electric motor 71 rotates gear 73 within a rear window wiper range 601, wherein the wiper blade moves between positions 87 and 89 (see FIG. 1), second and third intermittent motion mechanisms 77 and 79 will remain in their locked actuation positions 603 and 605. When electric motor 71 further rotates gear 73 in the same direction, it moves to a wiper park position 607 such that the wiper blade is disposed in its park position 91 (see FIG. 1). Electric motor 71 continues rotating gear 73 to an initial park position 609 which serves to separate the clutch of first intermittent motion mechanism 75; in this orientation, second and third intermittent motion mechanisms 77 and 79 have not yet been engaged by drive pin 515. When the wiper actuation is no longer desired and the panel locks remain in a locked condition, the electric motor 71 will cause drive pin 515 to remain in a first park zone 611 wherein the mechanism rests and waits further instructions from a multiplexed rear node microprocessor based controller receiving signals responsive to operator switch activation.

Upon receipt of the appropriate electrical command, electric motor 71 further continues the rotation of gear 73 to cause drive pin 515 to engage and press against second intermittent motion mechanism 77 at position 603. Gear 73 and drive pin 515 further rotate through a liftgate lock/unlock positional range 613 so as to rotate second intermittent motion mechanism 77 about pivot axis 511, thereby unlocking lock 101 (see FIG. 1). Lock actuation is completed and drive pin 515 disengages second intermittent motion mechanism 77 at the unlocked actuation position 615. Gear 73 and drive pin 515 are further rotated to a second park zone 617 to await further instructions.

Arm 505 of second intermittent motion mechanism 77 rotates from position 615 to a clearance position 619 such that drive pin 515 can continue in its rotational path 621 without interference of arm 505. However, it is necessary to bias arm 505 back into rotational path 621 of drive pin 515 for reengagement upon reversal of direction of gear 73. Foot 543 stops movement of bushing 531 when it abuts against an end wall 641 of pocket 545, so as to allow for limited rotation of arm 505 and base 503 independent of bushing 531. Accordingly, when arm 505 moves from position 615 to 619 then surface 535 of bushing 531 will abut against surface 537 of mounting base 503 at position 653, thereby flexing spring 541. Hence, when drive pin 515 rotates away from arm 505, spring 541 rotates arm 505 back to position 615. This same action occurs at abutting position 651, between actuation position 603 and another clearance position 631, upon reversal of rotation of gear 73.

Continued rotation of gear 73 and drive pin 515 operates third intermittent motion mechanism 79 in a similar manner to that of mechanism 77. Thus, arm 505 is rotated by drive pin 515 from a lift glass locked actuation position 605 to a lift glass release or unlock position 643, defining a lift glass actuation or release positional range 645. Arm 505 can further be flexed past actuation position 605 and 643 to drive pin clearance positions 647 and 649.

The geometry of actuation of second and third intermittent motion mechanisms 77 and 79, respectively, are believed to act in accordance with the following geometric calculations for one specific theoretical construction:

Drive pin 515 has a diameter of ³⁄₁₆ of an inch, lever arm 505 has a pivot to tip length of 1.25 inches, the diametral rotational path of drive pin 515 is 3 inches, and the distance from the outer diameter of drive pin 515 to the lever pivot is ½ inch;

$a_1$, the angle of lock actuation, is 60°;

$a_2$, the distance which bushing 531 travels between positions 651 and 653 before the abutting of surfaces 535 against surfaces 537, is 80°; and $a_3$, the maximum flexure distance of lever arm 505 between clearance positions 619 and 631, is 100°.

$$\frac{\beta}{2} + \frac{\alpha_3}{2} = 90° \quad \text{(a)}$$

$$\beta = 80°$$

$$\frac{\gamma}{360} = \frac{.187}{\pi \times 2.75} \quad \text{(b)}$$

$\gamma = 80°$ − (approximately) total angle = 88°.

Figure 28:
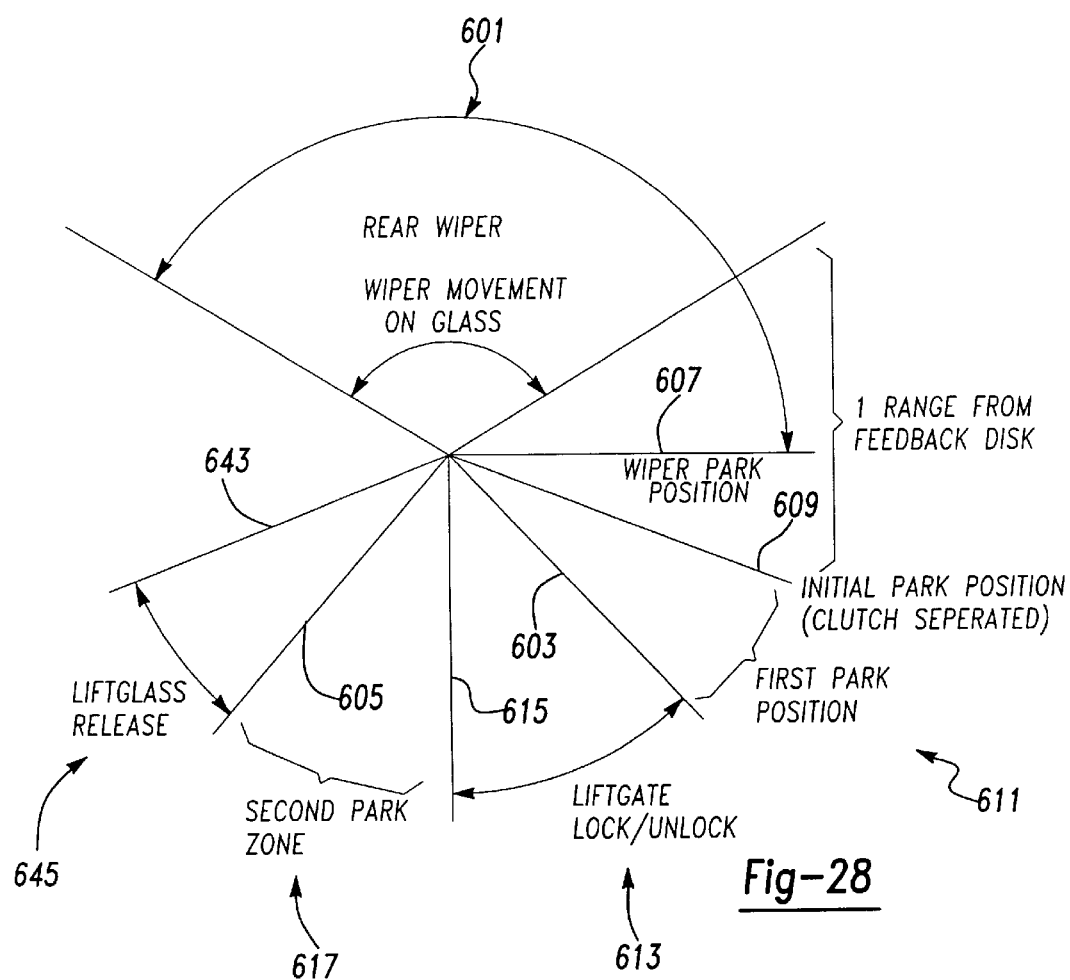
FIG. 28 is a diagram showing positional ranges of the preferred embodiment apparatus.

Formula (a) calculates the a angles while formula (b) calculates the total clearance angle between positions 603 and 615 of FIG. 28.

Figure 32:
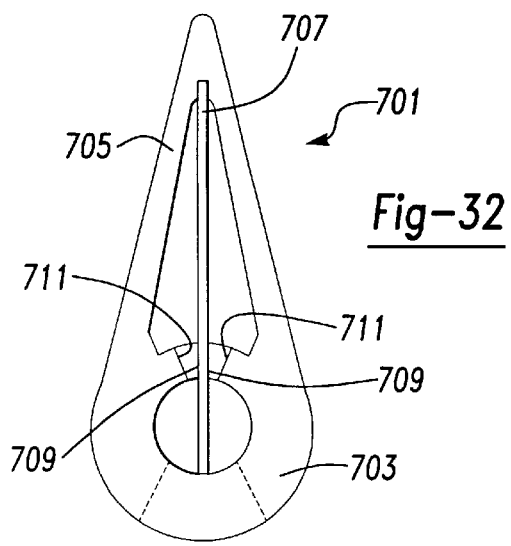
FIG. 32 is a rear elevational view showing a second preferred embodiment lever intermittent motion mechanism of the apparatus of the present invention.
Figure 33:
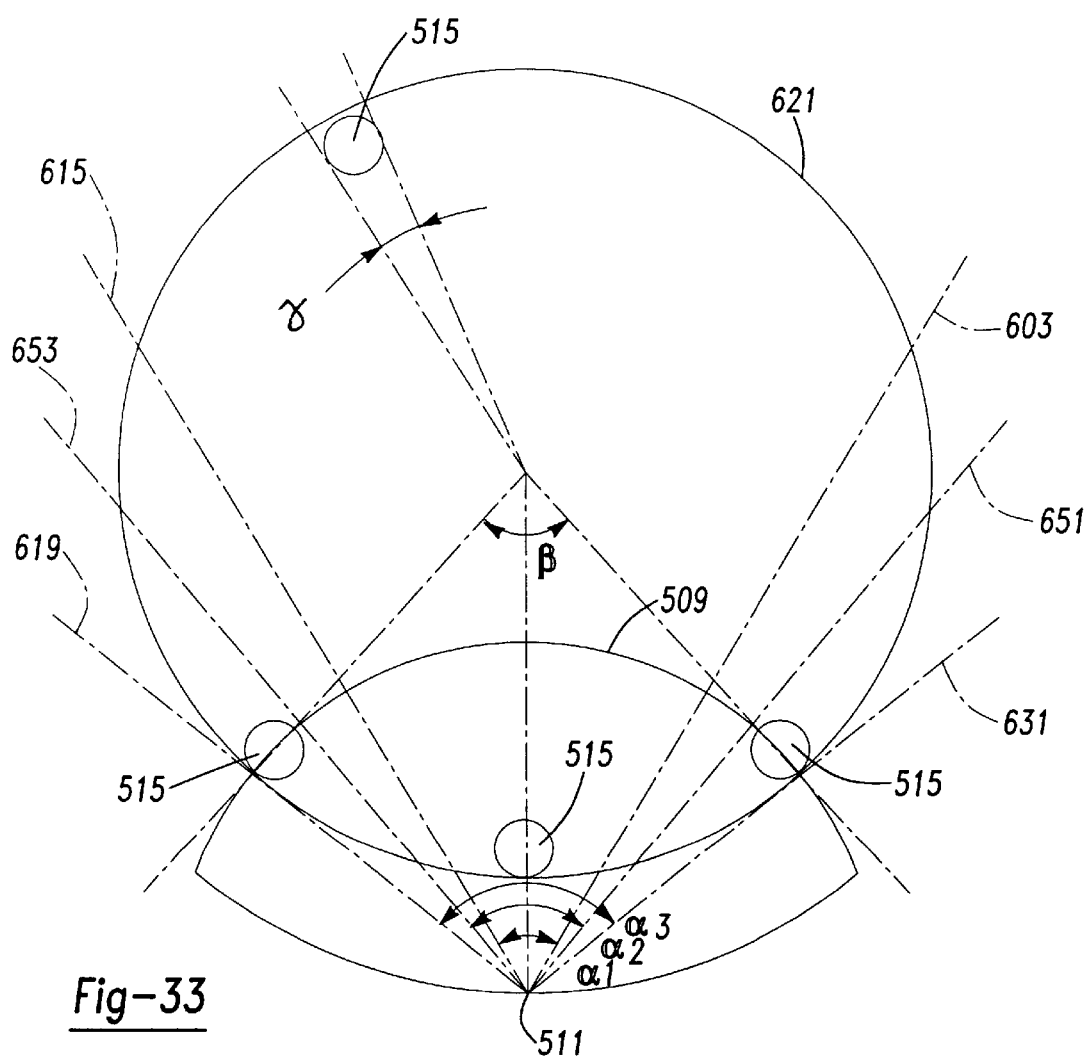
FIG. 33 is a diagrammatic view showing the various positions of the first preferred embodiment lever intermittent motion mechanism.

A second preferred embodiment of second and third intermittent motion mechanisms 77 and 79 is shown in FIG. 32. In this embodiment, a lever 701 is essentially the same as that shown in FIG. 29 except the present embodiment integrates the bushing directly into a mounting base 703 from which an arm 705 extends. Accordingly, a leaf spring 707 is directly mounted between arm 705 and base 703 and has abutting surfaces 709 which abut against abutting surfaces 711 of mounting base 703.

Figure 34:
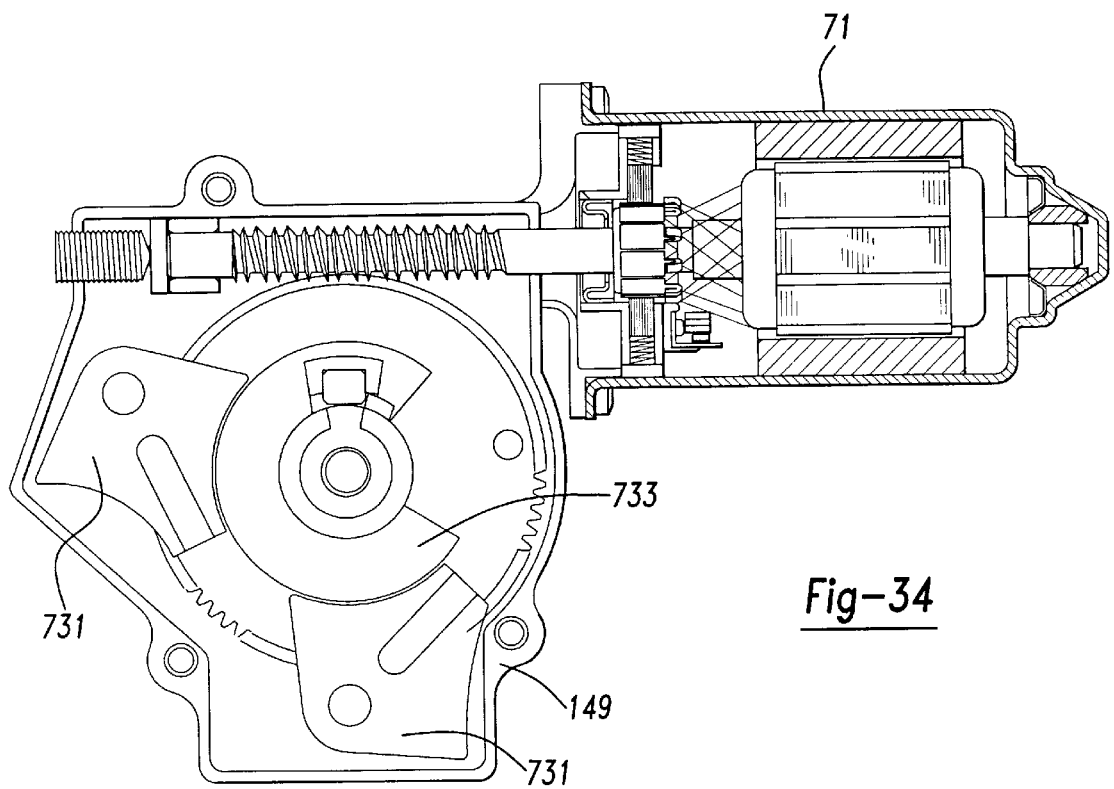
FIG. 34 is a rear elevational view showing a first alternate embodiment of the apparatus of the present invention employing a pair of geneva intermittent motion mechanisms.
Figure 35:
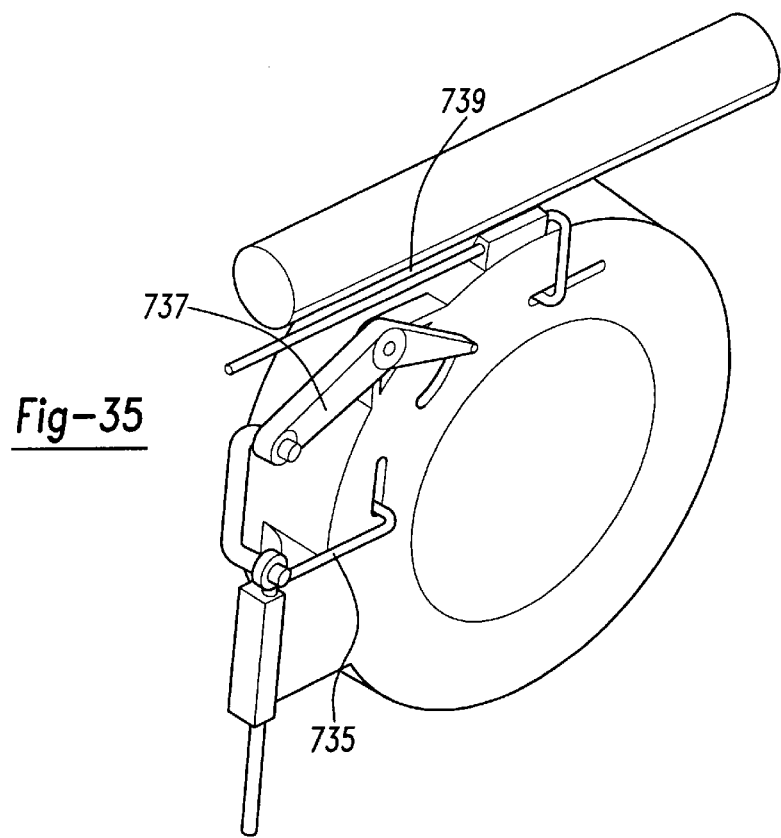
FIG. 35 is a rear perspective view showing a second alternate embodiment of the apparatus of the present invention employing wire and fulcrum-type linkage intermittent motion mechanisms.

Alternate second and third intermittent motion mechanisms can be constructed as geneva mechanisms 731 with a central locking drum 733, as shown in FIG. 34. A further alternate embodiment of second and third intermittent motion mechanisms employs a rotating bent wire 735 and fulcrum-type linkage 737, or a linearly sliding wire 739, as shown in FIG. 35. However, these alternate embodiment linkages do not achieve many of the advantages of the preferred embodiment lever mechanisms.

The disks, sleeves, lock and gears are all from an injection molded engineering grade polymeric material such as Delrin, while the wiper housing is cast or machined from Aluminum and the wiper shaft is steel.

While various embodiments of the present invention have been described, it will be appreciated that various modifications can be made. For example, the electric motor may alternately be an electromagnet, solenoid or other electromagnetic device. It is further envisioned that other actuating devices beyond those disclosed may be coupled to the disclosed intermittent motion mechanisms. Additional gears and linkages may also be employed between the intermittent motion mechanisms and the actuated devices or between the electric motor and the driving member, preferably disclosed herein as a helical main gear. Additionally, other mechanical lock configurations can be employed to pin the wiper in its park position during operation of the other actuating devices. Various materials have been disclosed in an exemplary fashion, however, other materials may of course be employed. It is intended by the following claims to cover these and any other departures from the disclosed embodiments which fall within the true spirit of this invention.

The invention claimed is:

1. An apparatus for use in an automotive vehicle comprising:

an electromagnetic device;

a rotatable member rotating in response to selective energization of said electromagnetic device;

an interface surface being disposed on said rotatable member;

a shaft being rotatably coupled to said rotatable member, said shaft being limited to less than 360° of rotational movement; and an intermittent motion mechanism having a mounting base and an arm;

rotation of said rotatable member within a first positional range causing said interface surface to contact and move said arm of said intermittent motion mechanism from a first actuation position to a second actuation position, said arm subsequently moving past said actuation positions so as to allow said interface surface to disengage said intermittent motion mechanism and continue rotating past said intermittent motion mechanism;

said arm being biased back into a rotational path of said interface surface such that upon reversal of rotational direction of said rotatable member, said interface surface will reengage said arm and move said intermittent motion mechanism from said second actuation position to said first actuation position.

2. The apparatus of claim 1 further comprising a first surface of said intermittent motion mechanism abutting against a second surface when said arm is moved past at least one of said actuation positions to a disengaging position, a spring serves to bias said arm from said disengaging position toward said actuation positions when said first and second surfaces abut against each other.

3. The apparatus of claim 2 wherein said second surface is part of said spring, said spring is a leaf spring.

4. The apparatus of claim 2 wherein said second surface is a projection depending from a substantially annular bushing disposed within said mounting base, said bushing rotates relative to said mounting base when said intermittent motion mechanism is moved between said at least one of said actuation positions and said disengaging position, said spring is attached to said bushing and said arm.

5. The apparatus of claim 1 further comprising:

a window wiper arm being attached to said shaft; and a panel lock having a latch moving in response to rotation of said intermittent motion mechanism between said actuation positions.

6. The apparatus of claim 5 further comprising a second intermittent motion mechanism coupling said wiper shaft to said rotatable member, said rotatable member being defined as a gear, said electromagnetic device being defined as a direct current electric motor.

7. The apparatus of claim 1 further comprising a second intermittent motion mechanism selectively engaging with said interfacing surface of said rotatable member when said rotatable member is disposed in a second positional range.

8. The apparatus of claim 1 further comprising an external edge of said arm providing an angled driven surface for contact against said interface surface, said mounting base rotating about a fixed pivot axis, a single arm extending in an elongated manner from said mounting base.

9. An apparatus for use in an automotive vehicle comprising:

a member being selectively movable;

an interface surface being disposed on said member;

a first intermittent motion mechanism having a mounting base and an elongated arm;

movement of said member within a first positional range in a first direction causing said interface surface to contact and rotate said arm of said first intermittent motion mechanism from a first actuation position to a second actuation position, said arm subsequently moving past said actuation positions so as to allow said interface surface to disengage said first intermittent motion mechanism and continue rotating past said first intermittent motion mechanism; and a second intermittent motion mechanism having a mounting base and an elongated arm;

movement of said member within a second positional range in said first direction causing said interface surface to contact and rotate said arm of said second intermittent motion mechanism from a first actuation position to a second actuation position, said arm subsequently moving past said actuation positions so as to allow said interface surface to disengage said second intermittent motion mechanism and continue rotating past said second intermittent motion mechanism;

said arms of said intermittent motion mechanisms being biased back into a rotational path of said interface surface such that upon reversal of rotational direction of said rotatable member, said interface surface will reengage said arms and move said intermittent motion mechanisms.

10. The apparatus of claim 9 further comprising a first surface of each of said intermittent motion mechanisms abutting against a second surface when each of said arms are moved past at least one of said actuation positions to disengaging positions, a spring serving to bias each of said arms from said disengaging positions toward said actuation positions when said first and second surfaces abut.

11. The apparatus of claim 9 further comprising:

a shaft rotating in response to movement of said member;

a window wiper arm being attached to said shaft; and a panel lock having a latch moving in response to rotation of said first intermittent motion mechanism between said actuation positions.

12. The apparatus of claim 9 further comprising an external edge of each of said arms providing an angled driven surface for contact against said interface surface, said mounting bases rotating about fixed pivot axes, a single arm extending in an elongated manner from each of said mounting bases.

13. The apparatus of claim 9 further comprising a panel lock having a latch moving in response to rotation of said first intermittent motion mechanism between said actuation positions.

14. A method of operating a motion transmitting apparatus for use in an automotive vehicle, said method comprising:

(a) selectively energizing an electromagnetic device;

(b) moving an interface surface from a first position to a second position in response to step (a);

(c) engaging an arm with said interface surface when said interface surface is in said first position;

(d) moving said arm from a locking position to an unlocking position concurrent with step (c);

(e) moving said arm to a disengaging position, past said unlocking position, concurrently with said interface surface moving past said second position;

(f) moving said interface surface from a third position to a fourth position;

(g) engaging and moving a second member concurrent with step (f);

(h) reversing the direction of movement of said interface surface;

(i) disengaging said interface surface from said second member in response to step (h);

(j) moving said interface surface from said second position to said first position subsequent to step (i);

(k) moving said arm from said unlocking position to said locking position concurrently with step (j); and (l) biasing said arm between said disengaging position and said unlocking position.

15. The method of claim 14 further comprising the step of rotating said second member about a pivot in response to selective engagement with said interface surface for unlocking a window panel from a door.

16. The method of claim 14 further comprising the step of biasing said arm between a second disengaging position and said locking position.

17. The method of claim 14 further comprising the step of rotating a window wiper shaft concurrently with movement of said interfacing surface between a fifth position and a sixth position.

18. The method of claim 14 further comprising the steps of:

(a) rotating said interface surface between said first, second, third and fourth positions;

(b) pivoting said arm about a fixed pivot axis; and (c) pivoting said member about a fixed pivot axis distinct from a rotational axis of said interfacing surface and a pivot axis of said arm.

\* \* \* \* \*